(12) United States Patent
Wang et al.

(10) Patent No.: US 10,313,863 B2
(45) Date of Patent: Jun. 4, 2019

(54) DOWNLINK EMERGENCY SERVICE TRANSMISSION METHOD, BASE STATION, USER EQUIPMENT, AND SYSTEM

(71) Applicant: Huawei Technologies Co., Ltd., Shenzhen (CN)

(72) Inventors: Xinzheng Wang, Shanghai (CN); Tianle Deng, Shenzhen (CN); Kaijie Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/015,628

(22) Filed: Jun. 22, 2018

(65) Prior Publication Data

US 2018/0302778 A1 Oct. 18, 2018

Related U.S. Application Data

(63) Continuation of application No. PCT/CN2015/098516, filed on Dec. 23, 2015.

(51) Int. Cl.
*H04L 5/00* (2006.01)
*H04W 4/90* (2018.01)
(Continued)

(52) U.S. Cl.
CPC ............... *H04W 4/90* (2018.02); *H04L 5/00* (2013.01); *H04W 28/26* (2013.01);
(Continued)

(58) Field of Classification Search
CPC ........... H04W 72/0446; H04W 72/042; H04W 72/0453; H04W 74/006; H04W 72/1289;
(Continued)

(56) References Cited

U.S. PATENT DOCUMENTS

2010/0099439 A1    4/2010   Aghili et al.
2011/0281548 A1   11/2011   Liang et al.
(Continued)

FOREIGN PATENT DOCUMENTS

CN         1855839 A    11/2006
CN   101102320 A     1/2008
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V121.0, Sep. 2015, 136 pages.
(Continued)

*Primary Examiner* — Nizar N Sivji
(74) *Attorney, Agent, or Firm* — Slater Matsil, LLP

(57) ABSTRACT

A downlink emergency service transmission method and a system, where the method includes reserving, by a base station from system resource, resource as reserved resource for transmitting a downlink emergency service, sending, by the base station, first indication information to user equipment, so as to instruct the user equipment to receive a downlink emergency service by using a resource indicated by the first indication information, where the first indication information is used to indicate the reserved resource, and sending, by the base station, the downlink emergency service to the user equipment by using the reserved resource.

17 Claims, 11 Drawing Sheets

(51) Int. Cl.
*H04W 28/26* (2009.01)
*H04W 72/04* (2009.01)
*H04W 72/12* (2009.01)
*H04W 76/50* (2018.01)

(52) U.S. Cl.
CPC ..... *H04W 72/042* (2013.01); *H04W 72/1289* (2013.01); *H04W 76/50* (2018.02); *H04W 72/1242* (2013.01)

(58) Field of Classification Search
CPC ........... H04W 72/085; H04W 74/0841; H04W 48/12; H04W 74/085; H04W 28/20; H04W 28/26; H04W 52/0206; H04W 72/0473; H04W 72/1226; H04L 5/0085; H04L 45/302
See application file for complete search history.

(56) References Cited

U.S. PATENT DOCUMENTS

| 2012/0014332 | A1* | 1/2012 | Smith | H04W 16/14 370/329 |
| 2012/0044938 | A1 | 2/2012 | He | |
| 2015/0009881 | A1 | 1/2015 | Yeh et al. | |
| 2016/0127032 | A1* | 5/2016 | Kim | H04B 7/185 455/427 |
| 2018/0191473 | A1* | 7/2018 | Ashraf | H04L 5/0007 |

FOREIGN PATENT DOCUMENTS

| CN | 101146052 A | 3/2008 |
| CN | 101841791 A | 9/2010 |
| CN | 101902405 A | 12/2010 |
| WO | 2010060356 A1 | 6/2010 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 12)," 3GPP TS 36.212 V12.6.0, Sep. 2015, 95 pages.

"3rd Generation Partnership Project; Technical Specification Group Radio Access Network; Evolved Universal Terrestrial Radio Access (E-UTRA); Physical Layer Procedures (Release 11)," 3GPP TS 36.213 V11.11.0, Jun. 2015, 183 pages.

Abdoli, J. et al., "Filtered OFDM: A New Waveform for Future Wireless Systems," 2015 IEEE 16th International Workshop on Signal Processing Advances in Wireless Communications (SPAWC), 2015, 5 pages.

Berardinelli, G. et al., "On the Potential of Zero-Tail DFT-Spread-OFDM in 5G Networks," 2014 IEEE 80th Vehicular Technology Conference (VTC Fall), Sep. 2014, 6 pages.

Cherubini, G. et al., "Filter Bank Modulation Techniques for Very High-Speed Digital Subscriber Lines," Very High-Speed Digital Subscriber Line, IEEE Communications Magazine, vol. 38, No. 5, May 2000, 7 pages.

Fettweis, G. et al., "GFDM—Generalized Frequency Division Mulitplexing," 2009 IEEE 69th Vehicular Technology Conference (VTC Spring), Apr. 2009, 4 pages.

Muquet, B. et al., "Cyclic Prefixing or Zero Padding for Wireless Multicarrier Transmissions?," IEEE Transactions on Communications, vol. 50, No. 12, Dec. 2012, 13 pages.

Thorsten, W. et al., "5G Air Interface Design Based on Universal Filtered (UF-)OFDM," Proceedings of the 19th International Conference on Digital Signal Processing, Aug. 20-23, 2014, 6 pages.

\* cited by examiner

DOWNLINK EMERGENCY SERVICE TRANSMISSION METHOD, BASE STATION, USER EQUIPMENT, AND SYSTEM

CROSS-REFERENCE TO RELATED APPLICATIONS

This disclosure is a continuation of International Disclosure No. PCT/CN2015/098516, filed on Dec. 23, 2015, the disclosure of which is hereby incorporated by reference in its entirety.

TECHNICAL FIELD

The present disclosure relates to the field of communications technologies, and in particular, to a downlink emergency service transmission method, a base station, user equipment, and a system.

BACKGROUND

Emergency service transmission, for example, transmission of some alarm information in industrial control, is an application scenario in future 4.5G and 5G communications systems. For an emergency service, a small volume of data needs to be fast transmitted each time. A short transmission delay is an important feature of the emergency service.

In the prior art, when a base station sends a non-emergency service, to be specific, a conventional data service in an existing communications system, for example, a mobile broadband (MBB) service, to user equipment (UE), because a system resource in a current TTI has been allocated and occupied, the base station usually needs to wait for a next transmission time interval (TTI) or even a longer time to obtain an idle resource, and finally sends the downlink service by using the idle resource. The downlink service sending method in the prior art has low efficiency. If the prior art is used to transmit a downlink emergency service, a delay occurs in transmission of the downlink emergency service, and the UE cannot process the downlink emergency service in time.

SUMMARY

Embodiments of the present disclosure provide a downlink emergency service transmission method, a base station, user equipment, and a system.

According to a first aspect, a downlink emergency service transmission method is provided, is applied to a base station side, and includes reserving, by a base station from system resource, resource as reserved resource for transmitting a downlink emergency service, sending first indication information to user equipment, so as to instruct the user equipment to receive a downlink emergency service by using a resource indicated by the first indication information, and then sending, by the base station, the downlink emergency service to the user equipment by using the reserved resource.

The first indication information herein is used to indicate the reserved resource.

During implementation of the method described according to the first aspect, when the base station needs to send a downlink emergency service to the user equipment, the base station may directly send the downlink emergency service to the user equipment by using the reserved resource in a current transmission time interval. Therefore, the downlink emergency service is sent in time.

In addition, the base station notifies the user equipment of indication information of the reserved resource, namely, the first indication information, so that the user equipment needs to monitor only the reserved resource to determine whether there is an emergency service sent to the user equipment, and does not need to search all the system resource for an emergency service sent to the user equipment. For example, in an LTE communications system, the user equipment may avoid performing full-frequency search to obtain an emergency service sent to the user equipment. Therefore, design complexity of receiving the emergency service by the user equipment is reduced.

According to a second aspect, a downlink emergency service transmission method is provided, is applied to a user equipment side, and includes receiving, by user equipment, first indication information sent by a base station, and receiving, based on the first indication information and by using a resource indicated by the first indication information, a downlink emergency service sent by the base station.

The first indication information herein is used to indicate reserved resource. The reserved resource is resource that is reserved by the base station from system resource and that is used to transmit a downlink emergency service.

During implementation of the method described according to the second aspect, the base station reserves the resource for the downlink emergency service, and when the base station needs to send an emergency service to the user equipment, the base station may directly send the downlink emergency service to the user equipment by using the reserved resource in a current transmission time interval. Therefore, the downlink emergency service is sent in time.

In addition, it may be understood that because the user equipment learns of indication information of the reserved resource, namely, the first indication information, the user equipment needs to monitor only the reserved resource to determine whether there is an emergency service sent to the user equipment, and does not need to search all the system resource for an emergency service sent to the user equipment. For example, in an LTE communications system, the user equipment may avoid performing full-frequency search to obtain an emergency service sent to the user equipment. Therefore, design complexity of receiving the emergency service by the user equipment is reduced.

It may be understood that it is unsuitable to have excessive reserved resources provided that transmission of the emergency service can be supported, so as to avoid waste of the system resource. However, to transmit the emergency service correctly and efficiently, the reserved resource needs to at least support transmission of control information of the emergency service.

In an implementation, the base station may send the control information of the downlink emergency service to the user equipment by using the resource indicated by the first indication information. The control information includes second indication information, so as to instruct the user equipment to receive data information of the downlink emergency service by using a resource indicated by the second indication information. The second indication information herein is used to indicate a resource occupied by the data information of the downlink emergency service.

Correspondingly, the user equipment may receive the control information of the downlink emergency service by using the reserved resource, where the control information includes the second indication information, and receive the data information of the downlink emergency service based on the second indication information and by using the resource indicated by the second indication information. The second indication information herein is used to indicate the resource occupied by the data information of the downlink emergency service.

In the embodiments of the present disclosure, a part or all of the data information of the downlink emergency service may be transmitted by using a non-reserved resource.

In an implementation, if the non-reserved resource occupied by the data information of the downlink emergency service is also allocated to a non-emergency service, a downlink resource conflict occurs. When a downlink resource conflict occurs, to preferably ensure correct transmission of the downlink emergency service, the base station may send only the data information of the downlink emergency service by using the conflicting resource, and does not send the non-emergency service.

In an implementation, if a downlink resource conflict occurs, the base station may further send third indication information, to be specific, indication information of the conflicting resource, to user equipment that originally receives the non-emergency service by using the conflicting resource, so as to notify the user equipment that a resource indicated by the third indication information is occupied, and data transmitted on the occupied resource is not the non-emergency service that is expected to be received by the user equipment, so that the user equipment ignores the data on the occupied resource.

According to a third aspect, a base station is provided. The base station includes a unit configured to perform the method according to the first aspect.

According to a fourth aspect, user equipment is provided. The user equipment includes a unit configured to perform the method according to the second aspect.

According to a fifth aspect, a base station is provided, and is configured to perform the downlink emergency service transmission method described according to the first aspect. The base station may include a memory, a processor coupled to the memory, a transmitter, and a receiver. The transmitter is configured to send a mobile communications signal to user equipment. The receiver is configured to receive a mobile communications signal sent by the user equipment. The memory is configured to store code used to implement the downlink emergency service transmission method described according to the first aspect. The processor is configured to execute the program code stored in the memory, to be specific, to perform the downlink emergency service transmission method described according to the first aspect.

According to a sixth aspect, user equipment is provided, and is configured to perform the downlink emergency service transmission method described according to the second aspect. The user equipment includes a memory, a processor coupled to the memory, a transmitter, and a receiver. The transmitter is configured to send a mobile communications signal to a base station. The receiver is configured to receive a mobile communications signal sent by the base station. The memory is configured to store code used to implement the downlink emergency service transmission method described according to the second aspect. The processor is configured to execute the program code stored in the memory, to be specific, to perform the downlink emergency service transmission method described according to the second aspect.

According to a seventh aspect, a communications system is provided. The communications system includes the base station described according to the third aspect and the user equipment described according to the fourth aspect, or the base station described according to the fifth aspect and the user equipment described according to the sixth aspect.

In a possible implementation, the base station and the user equipment are in a long term evolution (LTE) communications system, and in a single transmission time interval, the reserved resource is K resource elements (REs) constituted by M symbols in time domain and N subcarriers in frequency domain, where M, N, and K are all positive integers, and $K=M*N$.

Optionally, in a single transmission time interval, the reserved resource may occupy all symbols of a physical shared channel, and does not occupy symbols of a physical control channel. Therefore, an unpredicted and sudden emergency service can be transmitted in time and transmission of control information of a non-emergency service is not affected.

In a possible implementation in the LTE communications system, the base station may send the control information of the downlink emergency service to the user equipment by using the K resource elements (REs). The control information includes the second indication information. The second indication information is used to indicate resource elements (REs) occupied by the data information.

In this way, the downlink emergency service occupies time-frequency resources of the LTE system as few as possible, so as to avoid waste of system resource. In addition, it may be understood that the user equipment can find, based on the second indication information included in the control information, the resource elements (REs) occupied by the data information, and can receive the data information by using the resource elements (REs) occupied by the data information.

In a possible implementation in the LTE communications system, if a data volume that can be transmitted by using the reserved K resource elements (REs) is greater than a data volume of the control information, the base station may further transmit a part or all of the data information of the downlink emergency service by using the K resource elements (REs), so as to make full use of the reserved K resource elements (REs).

In a possible implementation in the LTE communications system, the control information and the data information may occupy a same symbol, so as to simultaneously send the control information and the data information.

In a possible implementation, the base station and the user equipment are in a universal mobile telecommunications system (UMTS), and in a single transmission time interval, the reserved resource is an available spreading code that is reserved by the base station from downlink spreading codes of the universal mobile telecommunications system and that is used to transmit the downlink emergency service.

In a possible implementation in the UMTS communications system, the base station may send the control information of the downlink emergency service to the user equipment by using the reserved spreading code. The control information includes indication information of a spreading code occupied by the data information of the downlink emergency service and an equipment identity of the user equipment.

In this way, the downlink emergency service occupies downlink spreading code resources of the UMTS system as few as possible, so as to avoid waste of system resource. In addition, it may be understood that the user equipment can find, based on the second indication information included in the control information, the spreading code occupied by the data information, and can receive the data information by using the spreading code occupied by the data information.

In a possible implementation in the UMTS communications system, if a data volume that can be transmitted by using the reserved spreading code is greater than a data volume of the control information of the downlink emergency service, the base station may further send a part or all of the data information of the downlink emergency service to the user equipment by using the reserved spreading code, so as to make full use of the reserved spreading code.

In a possible implementation, the base station and the user equipment are in a global system for mobile communications (GSM), and in a single transmission time interval, the reserved resource is a timeslot that is reserved by the base station from a plurality of timeslots included in a data frame transmitted in the single transmission time interval and that is used to transmit the downlink emergency service.

In a possible implementation in the GSM communications system, the base station may send the control information of the downlink emergency service to the user equipment by using the reserved timeslot. The control information includes indication information of a timeslot occupied by the data information of the downlink emergency service and an equipment identity of the user equipment.

In this way, the downlink emergency service occupies timeslot resources of the GSM system as few as possible, so as to avoid waste of system resource. In addition, it may be understood that the user equipment can find, based on the second indication information included in the control information, the timeslot occupied by the data information, and can receive the data information by using the timeslot occupied by the data information.

In a possible implementation in the GSM communications system, if a data volume that can be transmitted by using the reserved timeslot is greater than a data volume of the control information of the downlink emergency service, the base station or the user equipment may further transmit a part or all of the data information of the downlink emergency service by using the reserved timeslot, so as to make full use of the reserved timeslot.

According to an eighth aspect, a computer readable storage medium is provided. The readable storage medium stores program code used to implement the emergency service transmission method described according to the first aspect. The program code includes an execution instruction used to run the emergency service transmission method described according to the first aspect.

According to a ninth aspect, a computer readable storage medium is provided. The readable storage medium stores program code used to implement the emergency service transmission method described according to the second aspect. The program code includes an execution instruction used to run the emergency service transmission method described according to the second aspect.

In some possible implementations of the embodiments of the present disclosure, the reserved resource may be a resource statically configured by the base station, or the reserved resource may be a resource dynamically configured by the base station.

Specifically, the base station may send the first indication information to the UE, in other words, notify the UE of the reserved resource, in the following two manners. 1. The base station sends the first indication information to the UE by using a radio resource control RRC message or a broadcast message. This manner may be applied to a scenario in which the base station statically configures the reserved resource, in other words, the reserved resource remains unchanged within a relatively long time. 2. The base station sends the first indication information to the UE by using a control channel. In this manner, the base station may reselect, at regular intervals of one transmission period and based on a scheduling status of the system resource, a resource that is reserved for the emergency service from the system resource, so as to dynamically configure the reserved resource.

For example, the base station may send indication information of a re-adjusted reserved resource to the user equipment in each transmission time interval by using the control channel. In addition, like control information of a non-emergency service, the base station may also dispersedly send the indication information of the reserved resource in terms of frequency and time, so as to obtain a diversity gain.

During implementation of the embodiments of the present disclosure, the base station reserves, from the system resource, the reserved resource used to transmit the downlink emergency service, and when the base station needs to send an emergency service to the user equipment, the base station may directly send the downlink emergency service to the user equipment by using the reserved resource. Therefore, transmission efficiency of the downlink emergency service can be improved, and the downlink emergency service can be transmitted in time.

BRIEF DESCRIPTION OF THE DRAWINGS

To describe the technical solutions in the embodiments of the present disclosure more clearly, the following briefly describes the accompanying drawings required for describing the embodiments.

DETAILED DESCRIPTION OF ILLUSTRATIVE EMBODIMENTS

Terms used in implementation parts of the present disclosure are merely intended to explain specific embodiments of the present disclosure, not to limit the present disclosure. The following clearly describes the technical solutions in the embodiments of the present disclosure with reference to the accompanying drawings in the embodiments of the present disclosure.

Figure 1:
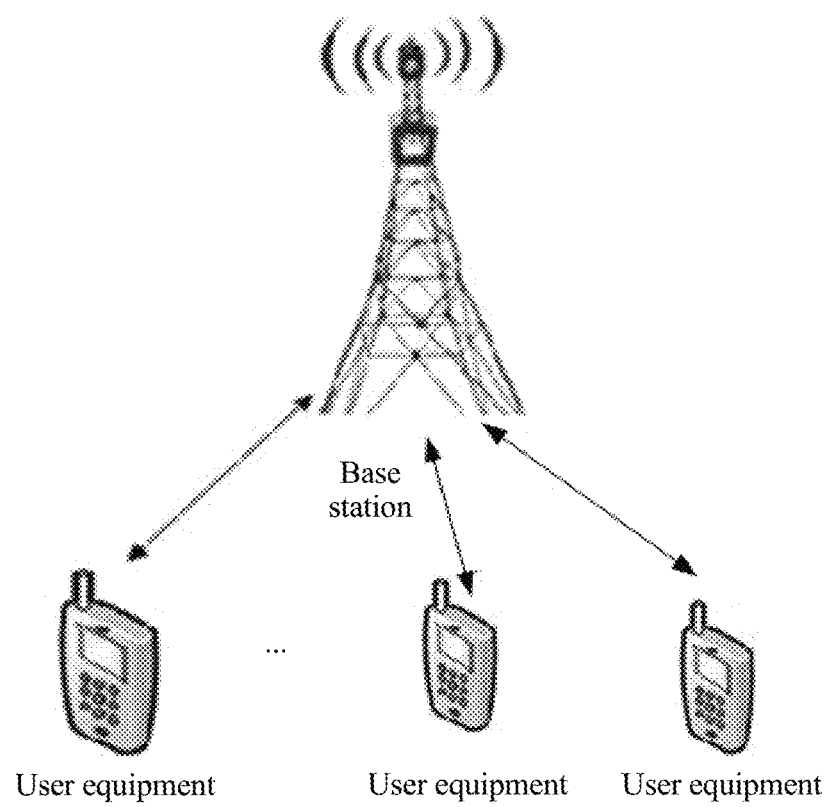
FIG. 1 is a schematic diagram of a communications system according to an embodiment of the present disclosure.

Referring to FIG. 1, FIG. 1 shows a communications system according to an embodiment of the present disclosure. A base station and UE communicate with each other by using an air interface technology. The air interface technology may include existing 2G (for example, GSM), 3G (for example, UMTS, WCDMA, and TD-SCDMA), 4G (for example, FDD LTE and TDD LTE), future available 4.5G and 5G systems, and the like. The base station may include an eNB in an LTE communications system, a NodeB in a UMTS communications system, and a base station (BS) in a GSM communications system. The UE is a user terminal in 3G and 4G networks, equivalent to a mobile station (MS) in a 2G network, and may include a wireless terminal such as a mobile phone or a tablet computer (which carries a SIM card), or may be a wireless terminal (for example, a sensor or a meter that can perform remote meter reading) in machine-to-machine (M2M) communication, or another mobile communications device.

A general concept of a downlink emergency service transmission method provided in the present disclosure is first described below. Separate implementations of the method in the present disclosure in three communications systems, including LTE (4G), UMTS (3G), and GSM (2G) are subsequently described in detail.

First, the general concept of the downlink emergency service transmission method provided in the present disclosure is described with reference to FIG. 2. A base station reserves, from system resource, resource as reserved resource for transmitting a downlink emergency service, in other words, the reserved resource is not occupied by a non-emergency service. When the base station needs to send an emergency service to user equipment, the base station may directly send the downlink emergency service to the user equipment by using the reserved resource. The resource in the embodiments of the present disclosure may be a time-frequency resource (for example, a resource block (RB) or an RE) in an LTE system, a spreading code in a UMTS system, or a timeslot resource in a GSM system. During actual disclosure, the reserved resource may be an air interface resource in another form. This is not limited herein.

Figure 2:
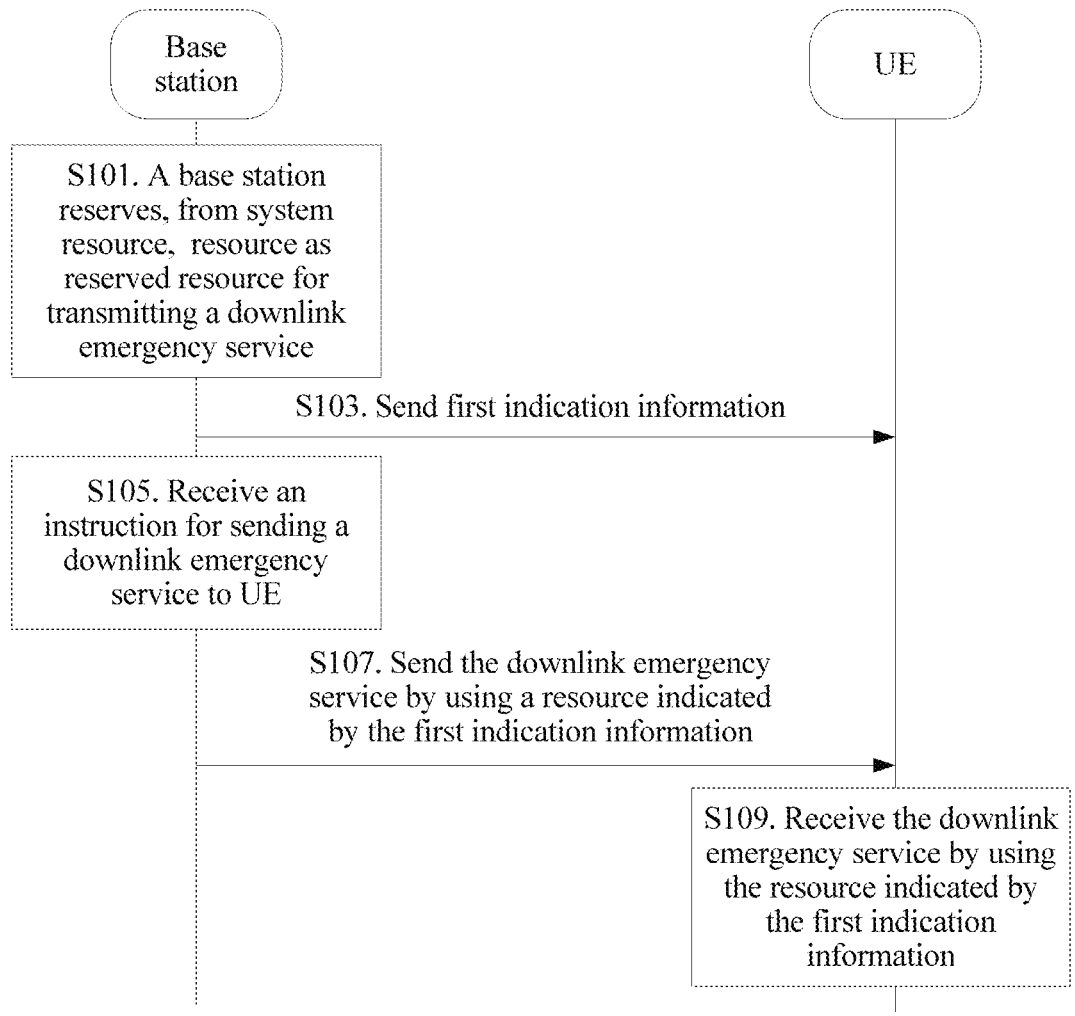
FIG. 2 is a schematic flowchart of a downlink emergency service transmission method according to an embodiment of the present disclosure.

Referring to FIG. 2, a downlink emergency service transmission method shown in FIG. 2 includes the following steps.

S101. A base station reserves, from system resource, resource as reserved resource for transmitting a downlink emergency service.

S103. The base station sends first indication information to UE, so as to instruct the UE to receive a downlink emergency service by using a resource indicated by the first indication information, namely, the reserved resource. The first indication information herein is used to indicate the reserved resource.

S105. The base station receives an instruction for sending a downlink emergency service to the UE.

S107. In response to the instruction received in S105, the base station may send the downlink emergency service to the UE by using the resource indicated by the first indication information.

S109. Correspondingly, the UE may receive the downlink emergency service by using the resource indicated by the first indication information.

In an implementation, after receiving the first indication information sent by the base station, the UE may monitor whether there is an emergence service sent to the UE on the resource indicated by the first indication information. If the UE detects that there is a downlink emergency service sent to the UE on the resource indicated by the first indication information, S109 is triggered and performed.

It may be understood that because of the first indication information, the UE needs to monitor only the reserved resource to determine whether there is an emergency service sent to the UE, and does not need to search all the system resource for an emergency service sent to the UE. Therefore, complexity of receiving the emergency service by the UE is reduced.

Specifically, the base station may send the first indication information to the UE, in other words, notify the UE of the reserved resource, in the following two manners.

1. The base station sends the first indication information to the UE by using a radio resource control (RRC) message or a broadcast message. This manner may be applied to a scenario in which the base station statically configures the reserved resource, in other words, the reserved resource remains unchanged within a relatively long time.

2. The base station sends the first indication information to the UE by using a control channel. In this manner, the base station may reselect, at regular intervals of one transmission period and based on a scheduling status of the system resource, a resource that is reserved for the emergency service from the system resource, so as to dynamically configure the reserved resource.

It should be noted that when dynamically configuring the reserved resource, the base station may periodically configure the reserved resource, for example, configure the reserved resource at regular intervals of one TTI or one data frame, or may aperiodically configure the reserved resource.

During implementation of the downlink emergency service transmission method shown in FIG. 2, when the base station needs to send an emergency service to the UE, the base station does not need to wait for an idle resource in a next TTI, but directly sends the downlink emergency service to the UE by using the reserved resource in a current TTI, so as to fast send the downlink emergency service. Correspondingly, the UE may receive the emergency service easily and fast by monitoring only the reserved resource, and therefore design complexity of the UE is reduced.

In this embodiment of the present disclosure, the downlink emergency service may include control information and data information. The control information of the downlink emergency service may include not only information indicating a modulation and coding scheme, a redundancy version of HARQ retransmission, and the like, but also indication information of a resource occupied by the data information. In this embodiment of the present disclosure, the latter indication information is referred to as second indication information. The second indication information in this embodiment of the present disclosure is used to indicate the resource occupied by the data information.

It may be understood that because the control information includes the second indication information, to be specific, indication information of the data information of the emergency service, the UE can find, based on the second indication information, the resource used by the data information of the emergency service, and can receive the data information by using the resource used by the data information.

In this embodiment of the present disclosure, it is unsuitable to have excessive reserved resources provided that transmission of the downlink emergency service can be supported, so as to avoid waste of the system resource. However, to transmit the downlink emergency service correctly and efficiently, the reserved resource needs to at least support transmission of the control information of the downlink emergency service. In an implementation, a size of the reserved resource may be determined based on a data volume of the control information of the downlink emergency service and a total data volume of all information (the control information and the data information), so that a data volume that can be transmitted on the reserved resource is greater than or equal to the data volume of the control information, but does not exceed the total data volume of the downlink emergency service. It should be noted that the size of the reserved resource may be alternatively determined based on an actual disclosure requirement, experience of transmitting the downlink emergency service, or the like. This is not limited in this embodiment of the present disclosure.

Specifically, the base station may send the control information to the UE by using the resource indicated by the first indication information, namely, the reserved resource. Correspondingly, the UE may receive the control information by using the resource indicated by the first indication information, namely, the reserved resource. In addition, because the control information includes the second indication information, the UE can receive the data information based on the second indication information and by using the resource indicated by the second indication information.

In this embodiment of the present disclosure, a part or all of the data information of the downlink emergency service may be transmitted by using a non-reserved resource. The non-reserved resource herein is a system resource other than the reserved resource, and may include a non-reserved resource allocated to a non-emergency service and a non-reserved resource that is not allocated to the non-emergency service.

In this embodiment of the present disclosure, if the non-reserved resource occupied by the data information of the downlink emergency service is also allocated to a non-emergency service, a downlink resource conflict occurs. In other words, when a resource allocated to the downlink non-emergency service is partially or exactly the same as the resource allocated to the part or all of the data information, a downlink resource conflict occurs. When a downlink resource conflict occurs, to preferably ensure correct transmission of the downlink emergency service, the base station may send only the data information of the downlink emergency service by using the conflicting resource, and does not send the non-emergency service. Another non-emergency service that is sent without using the conflicting resource is still normally transmitted, and is not affected.

During actual disclosure, if a downlink resource conflict occurs, the base station may further send, to user equipment that receives the non-emergency service, indication information indicating the conflicting resource, which is referred to as third indication information in this embodiment of the present disclosure, so as to notify the user equipment that a resource indicated by the third indication information is occupied, and data transmitted on the occupied resource is not the non-emergency service that is expected to be received by the user equipment, so that the user equipment ignores the data on the occupied resource. The third indication information herein is used to indicate the occupied resource, and the occupied resource is the conflicting resource.

In addition, if a downlink resource conflict occurs, in addition to notifying the user equipment that receives the non-emergency service by using the conflicting resource of the third indication information, the base station may further notify the user equipment that receives the non-emergency service of other information such as the non-reserved resource occupied by the downlink emergency service and an unoccupied non-reserved resource.

During specific implementation, after receiving the third indication information, the user equipment that receives the non-emergency service by using the conflicting resource may request the base station to retransmit the non-emergency service, so as to correctly receive the non-emergency service.

In this embodiment of the present disclosure, if the data volume that can be transmitted by using the reserved resource is greater than the data volume of the control information, the base station may transmit a part of the data information of the downlink emergency service by using the reserved resource, and transmit the other part of the data information by using the non-reserved resource. It may be understood that in this case, the resource indicated by the second indication information may include two parts, the reserved resource occupied by the data information, and the non-reserved resource occupied by the data information.

It should be noted that expressions such as first, second, and third used in this embodiment of the present disclosure are merely intended to differentially describe various types of indication information in this embodiment of the present disclosure, and are not intended to limit a sequence.

During implementation of this embodiment of the present disclosure, the base station reserves, from the system resource, the reserved resource used to transmit the downlink emergency service, so that the base station can directly send the downlink emergency service to the UE by using the reserved resource, thereby improving transmission efficiency of the downlink emergency service, and implementing timely transmission of the downlink emergency service. In addition, the base station notifies the UE of the indication information of the reserved resource, so that the UE needs to monitor only the reserved resource to determine whether there is a downlink emergency service sent to the UE, and does not need to search all the system resource, thereby reducing design complexity of the UE.

An implementation of the method in the present disclosure in an LTE (4G) communications system is described in detail below with reference to FIG. 3A to FIG. 3C.

Figure 3A:
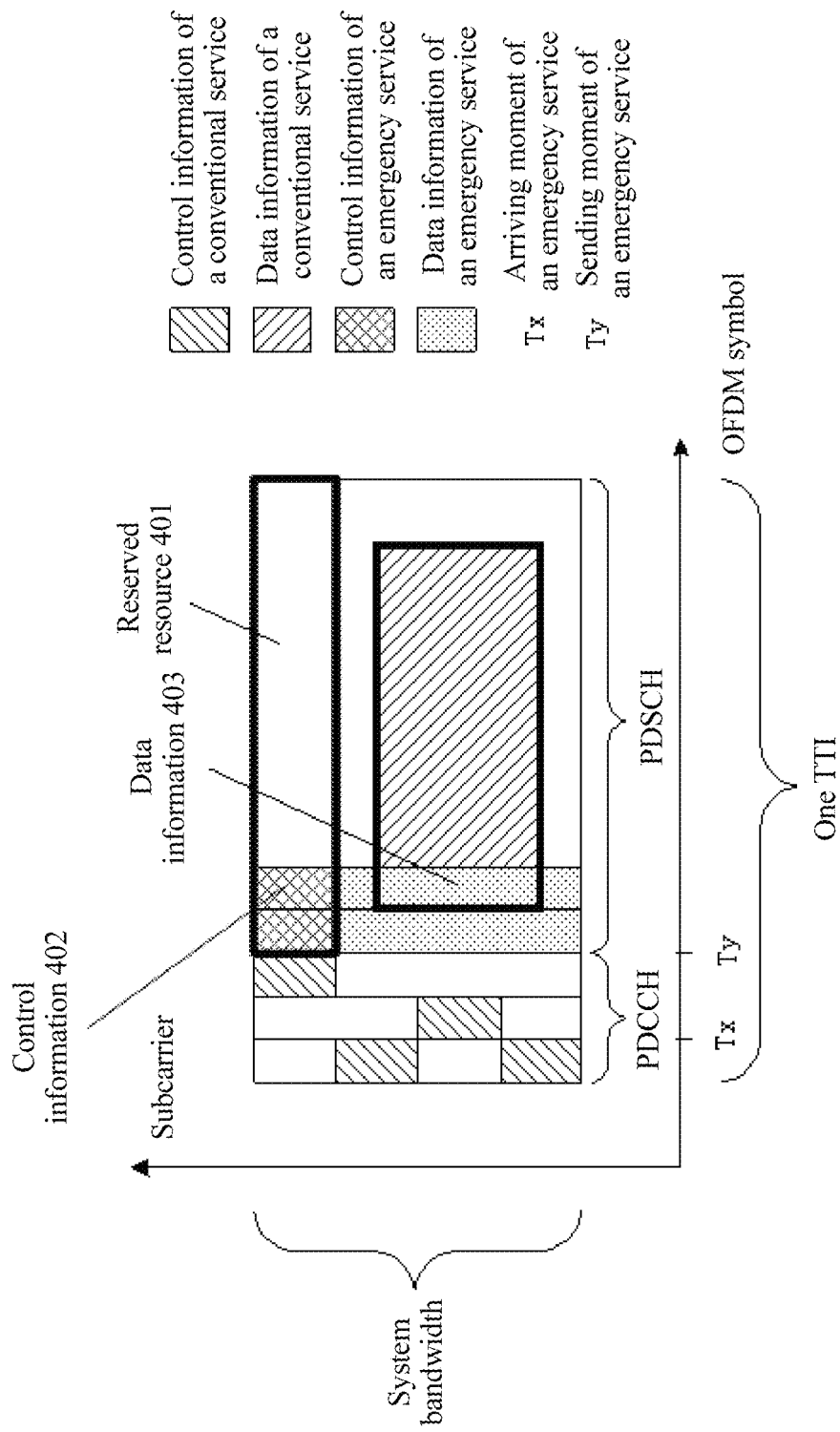
FIG. 3A is a schematic diagram of allocating an LTE downlink time-frequency resource according to an embodiment of the present disclosure.

Referring to FIG. 3A, FIG. 3A shows an example of allocating a downlink time-frequency resource in the LTE system.

As shown in FIG. 3A, in a single TTI, first N (N ranges from 1 to 4, and including N=1 and N=4) OFDM symbols are used to transfer a PDCCH, and the other OFDM symbols are used to transfer a PDSCH. A PDCCH in FIG. 3A occupies three (that is, N=3) OFDM symbols. One TTI herein is transmission duration of one data frame.

A reserved resource 401 in FIG. 3A is a time-frequency resource reserved by a base station for a downlink emergency service. As shown in FIG. 3A, in a single TTI, the reserved resource 401 may occupy X OFDM symbols in time domain, and occupy Y subcarriers in frequency domain. The X OFDM symbols and the Y subcarriers in frequency domain constitute Z resource elements (REs), where X, Y, and Z are all positive integers, and Z=X*Y. In other words, the reserved resource 401 includes the Z resource elements (RE). Preferably, the reserved resource 401 may occupy all OFDM symbols of the PDSCH, and does not occupy OFDM symbols of the PDCCH. Therefore, an unpredicted and sudden downlink emergency service can be sent in time and transmission of control information of a non-emergency service is not affected.

In this embodiment of the present disclosure, in a process of transmitting the downlink emergency service, control information 402 and data information 403 may occupy a same OFDM symbol as shown in FIG. 3A, so as to simultaneously send the control information 402 and the data information 403.

It should be noted that during actual disclosure, the control information 402 and the data information 403 may occupy different SC-FDMA symbols, in other words, there is a delay between the control information 402 and the data information 403. For example, in the reserved resource 401, the control information 402 occupies an $i^{th}$ SC-FDMA symbol, and the data information 403 occupies an $(i+1)^{th}$ SC-FDMA symbol. Therefore, both the control information 402 and the data information 403 are sent by using the reserved resource 401, and the emergency service is transmitted without affecting transmission of a non-emergency service, where i is a positive integer. The example is merely an implementation of this embodiment of the present disclosure, and there may be a different implementation during actual disclosure. For example, there is a delay of two SC-FDMA symbols between the control information 402 and the data information 403. This is not limited herein.

In this embodiment of the present disclosure, because the downlink emergency service requires a short transmission time, the downlink emergency service needs to occupy SC-FDMA symbols as few as possible.

For example, in FIG. 3A, the control information 402 and the data information 403 occupy one SC-FDMA symbol in total. On the reserved resource 401, if an RE on the SC-FDMA symbol cannot support transmission of all data (the control information 402 and the data information 403) of the downlink emergency service, besides the reserved resource 401, the base station may send a part or all of the data information 403 by using an RE occupied by a non-emergency service on the SC-FDMA symbol. In other words, the part or all of the data information 403 may use a time-frequency resource the same as that used by a downlink non-emergency service for another user, and consequently a resource conflict occurs.

To preferably transmit the downlink emergency service, the base station may send only the part or all of the data information 403 on the conflicting RE, and does not send the downlink non-emergency service for the another user.

If a downlink resource conflict occurs, the base station may further send third indication information to user equipment that originally receives the non-emergency service by using the conflicting resource, so as to notify the user equipment that a resource indicated by the third indication information is occupied, and data transmitted on the occupied resource is not the non-emergency service that is expected to be received by the user equipment, so that the user equipment ignores the data on the occupied resource. During specific implementation, after receiving the indication information of the conflicting resource, the user equipment that originally receives the non-emergency service by using the conflicting resource may request the base station to retransmit the non-emergency service, so as to correctly receive the non-emergency service.

It may be understood that to inform UE of an object to which the downlink emergency service is sent, the control information of the downlink emergency service further needs to carry a user equipment identity (UE ID). Optionally, the user equipment identity may be hidden in CRC. For example, the CRC is scrambled by using a sequence related to the UE ID, so as to prevent other UE that receives the non-emergency service from parsing the control information of the downlink emergency service.

Figure 3B:
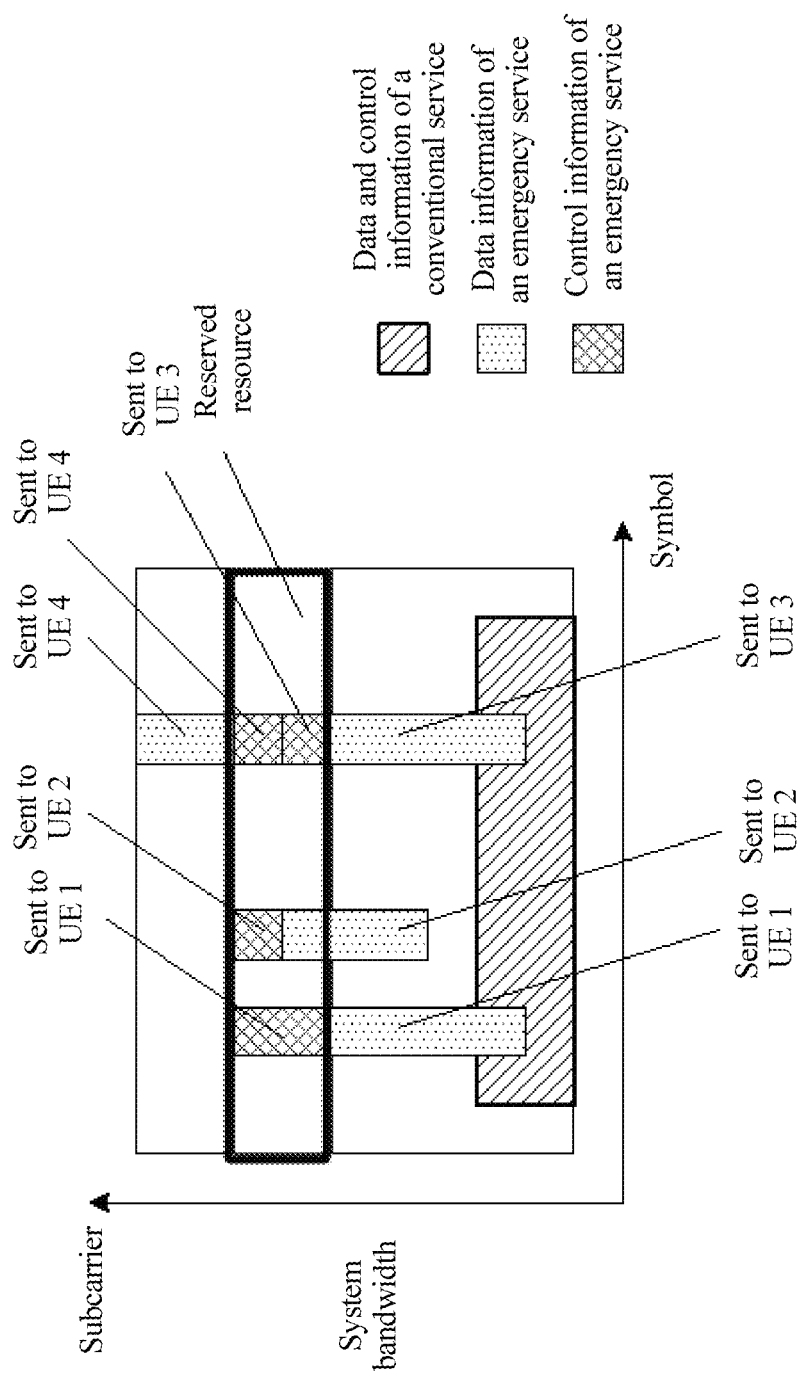
FIG. 3B is another schematic diagram of allocating an LTE time-frequency resource according to an embodiment of the present disclosure.

Referring to FIG. 3B, FIG. 3B shows another example of allocating a downlink time-frequency resource in the LTE system.

As shown in FIG. 3B, a base station may simultaneously send a downlink emergency service to two UEs, for example, UE 3 and UE 4 in FIG. 3B, in one symbol. During actual disclosure, the base station may simultaneously send a downlink emergency service to more than two UEs in one symbol.

In this embodiment of the present disclosure, in a process of transmitting a downlink emergency service in the LTE system, an RE occupied by reserved resource may be statically configured, in other words, remains unchanged within a relatively long time. Alternatively, an RE occupied by reserved resource may be dynamically reselected by the base station from system resource based on a scheduling status of the system resource. It should be noted that the base station may periodically, for example, at regular intervals of one TTI or one data frame, and dynamically configure the reserved resource, or may aperiodically and dynamically configure the reserved resource.

Figure 3C:
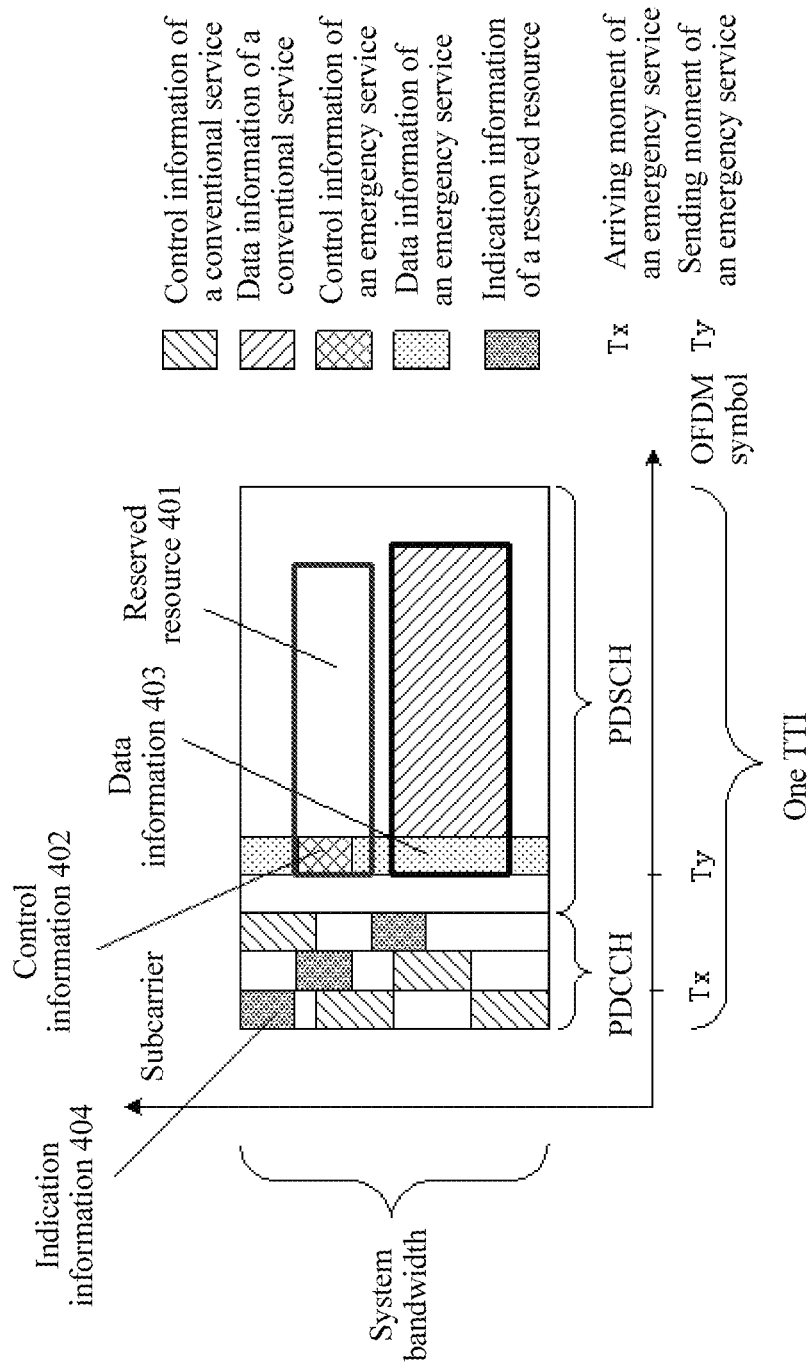
FIG. 3C is still another schematic diagram of allocating an LTE time-frequency resource according to an embodiment of the present disclosure.

To enable the reserved resource to change with a transmission period of a data frame, as shown in FIG. 3C, the base station may send indication information 404 of the reserved resource, namely, first indication information, to UE by using a control channel (PDCCH) in each TTI. In addition, like control information of a non-emergency service, the indication information 404 of the reserved resource may also be dispersedly sent in terms of frequency and time, so as to obtain a diversity gain.

It should be noted that all implementations of allocating a time-frequency resource shown in FIG. 3A to FIG. 3C may be applied to a future communications system (for example, 4.5G or 5G). In the future communications system, there is also a concept similar to subcarrier in terms of frequency and a concept similar to symbol (similar to an OFDM symbol or an SC-FDMA symbol) in terms of time.

During implementation of the downlink emergency service transmission method provided in the present disclosure in the LTE system, a time-frequency resource used to transmit a downlink emergency service is reserved from time-frequency resources of the LTE system. When the base station receives an instruction for transmitting a downlink emergency service to UE in a current TTI, the base station may directly send the downlink emergency service to the UE by using the reserved time-frequency resource. Therefore, transmission efficiency of the downlink emergency service is improved, and the downlink emergency service can be transmitted in time.

An implementation of the method in the present disclosure in a UMTS (3G) communications system is briefly described below with reference to FIG. 4A to FIG. 4C. The UMTS communications system uses a code division multiple access (CDMA) communications manner, and a resource in the UMTS communications system is mainly a spreading code.

Figure 4A:
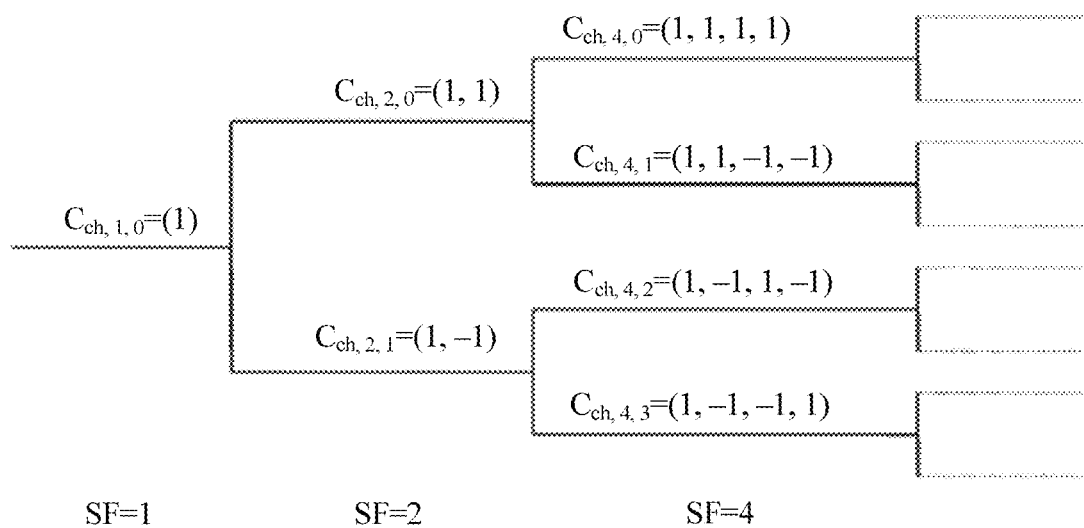
FIG. 4A is a schematic diagram of a UMTS spreading code tree according to an embodiment of the present disclosure.

Referring to FIG. 4A, FIG. 4A shows a spreading code tree in the UMTS communications system. A spreading code is represented as $C_{ch,SF,k}$, where SF is a spreading factor (SF), and k is a code channel number.

In the UMTS communications system, there are extremely abundant uplink code resources, and one UE is corresponding to one spreading code tree. However, there are limited downlink code resources, and one cell is corresponding to merely one spreading code tree. To transmit a downlink emergency service in time, a base station may reserve an available (unoccupied) spreading code used to transmit the downlink emergency service from downlink spreading codes provided by a system. The reserved spreading code is not to be occupied by a non-emergency service. The reserved spreading code herein is reserved resource. For example, the base station may select a spreading code $C_{ch,4,0}$ from the downlink spreading code tree shown in FIG. 4A as the spreading code used to transmit the downlink emergency service.

In a possible implementation, the base station may reserve, from a high speed physical downlink shared channel (HS-PDSCH), the spreading code used to transmit the downlink emergency service. The high speed physical downlink shared channel HS-PDSCH has a spreading factor of 16, in other words, a maximum of 15 HS-PDSCH channels may be allocated to each cell. Then, the base station may reserve an HS-PDSCH spreading code used to transmit the downlink emergency service from the 15 HS-PDSCH channels. For example, the base station reserves, from an HS-PDSCH downlink spreading code tree, a spreading code $C_{ch,16,3}$ used to transmit the downlink emergency service, in other words, the fourth HS-PDSCH code channel is reserved for the downlink emergency service. The example is merely an implementation of the present disclosure, and there may be a different implementation during actual disclosure. This shall not be construed as a limitation.

In another possible implementation, the base station may reserve, from a dedicated physical channel (DPCH), the spreading code used to transmit the downlink emergency service. The DPCH has an SF ranging from 4 to 512. DPCHs sent by the base station to different UEs have different spreading factors (determined based on a service rate) and spreading codes. Then, the base station may reserve, from a DPCH corresponding to each UE, a spreading code used to transmit a downlink emergency service corresponding to each UE. For example, a DPCH for UE 1 has an SF of 256, and a spreading code that is reserved for the UE 1 and that is used to transmit a downlink emergency service is $C_{ch,256,127}$, in other words, the $128^{th}$ code channel of the DPCH for the UE 1 is reserved for the downlink emergency service corresponding to the UE 1. For another example, a DPCH for UE 2 has an SF of 32, and a spreading code that is reserved for the UE 2 and that is used to transmit a downlink emergency service is $C_{ch,32,16}$, in other words, the $16^{th}$ code channel of the DPCH for the UE 2 is reserved for the downlink emergency service corresponding to the UE 2. The example is merely an implementation of the present disclosure, and there may be a different implementation during actual disclosure. This shall not be construed as a limitation.

It should be noted that in addition to the HS-PDSCH and the DPCH, the base station may further reserve a downlink spreading code of another type for the downlink emergency service, for example, a spreading code corresponding to a shared control channel for HS-DSCH (HS-SCCH). This is not limited herein.

It should be noted that the base station may reserve one or at least two spreading codes used to transmit the downlink emergency service.

In this embodiment of the present disclosure, a data transmission rate of a code channel corresponding to the reserved spreading code used to transmit the downlink emergency service should not be excessively high provided that transmission of the downlink emergency service can be supported, so as to avoid waste of the system resource. However, to transmit the downlink emergency service correctly and efficiently, the code channel corresponding to the reserved spreading code needs to at least support transmission of control information of the downlink emergency service. Specifically, the base station may send a downlink emergency service to UE by using the reserved spreading code in a current TTI.

Figure 4B:
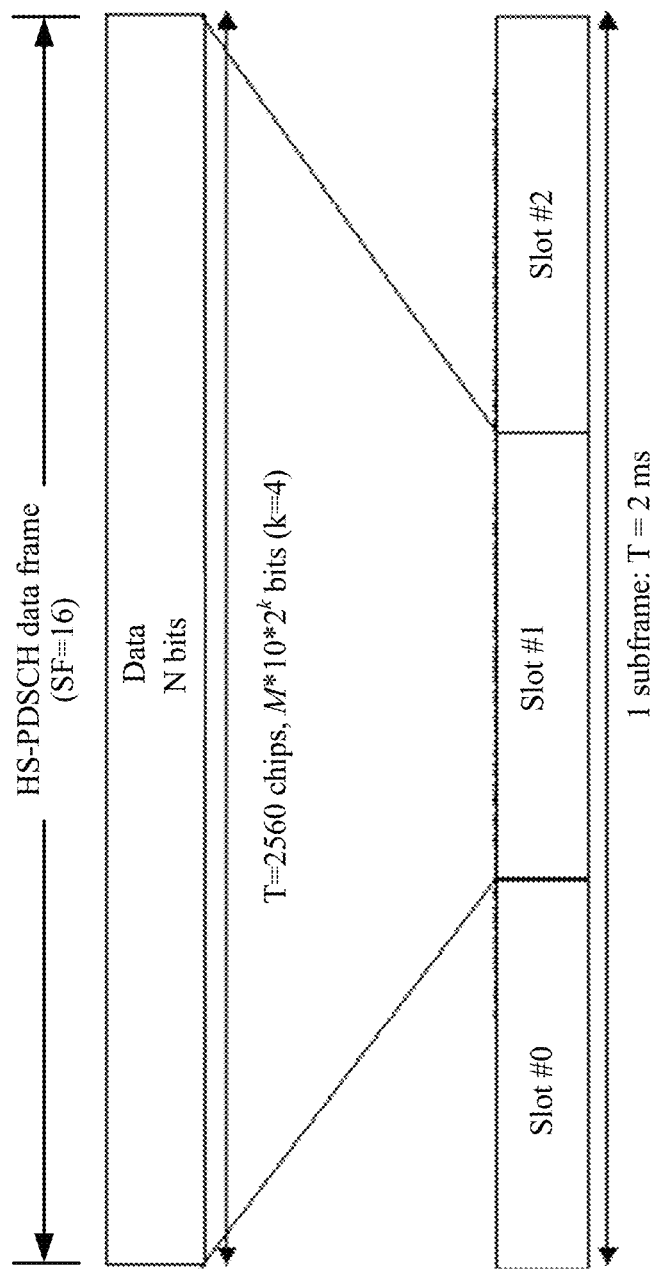
FIG. 4B is a schematic diagram of an HS-PDSCH data frame in UMTS according to an embodiment of the present disclosure.
Figure 4C:
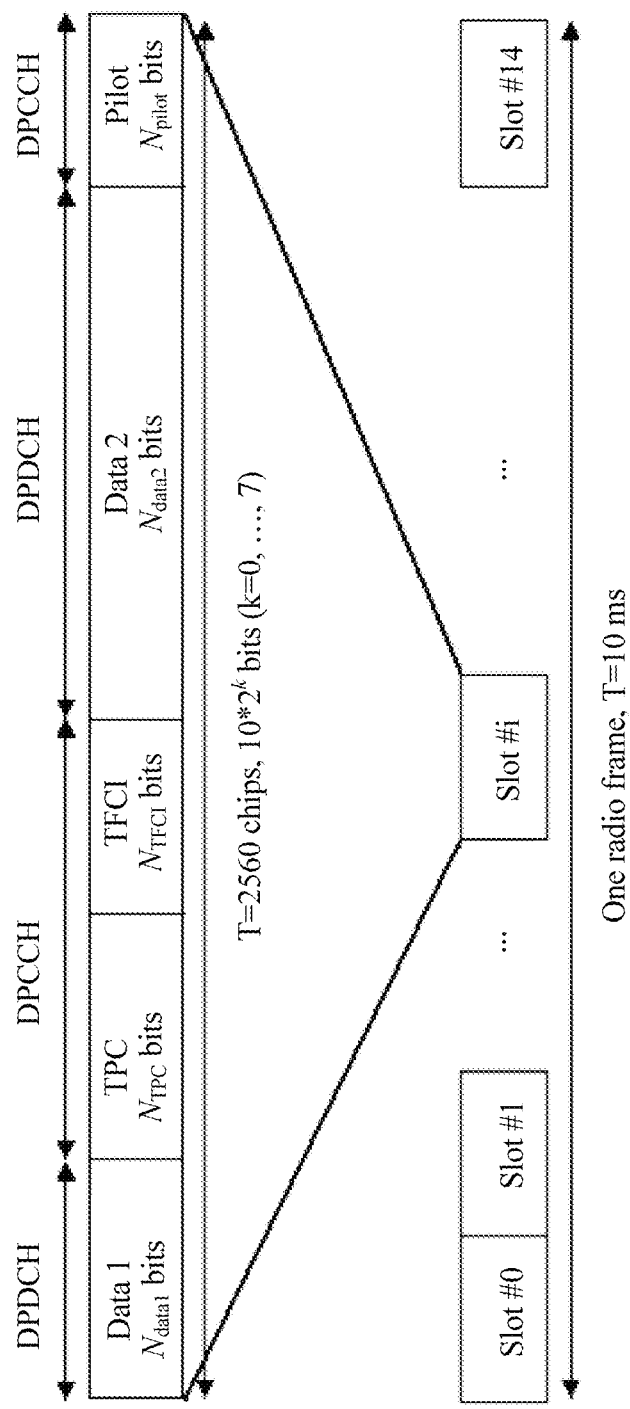
FIG. 4C is a schematic diagram of a DPCH data frame in UMTS according to an embodiment of the present disclosure.

For example, the base station may transmit the downlink emergency service by using the reserved spreading code (belonging to spreading codes corresponding to the HS-PDSCH) on a timeslot 1 of an HS-PDSCH data frame shown in FIG. 4B. For another example, the base station may transmit the downlink emergency service by using the reserved spreading code (belonging to spreading codes corresponding to the DPCH) on a timeslot i (i is a positive integer) of a DPCH data frame shown in FIG. 4C. The example is merely an implementation of this embodiment of the present disclosure, and there may be a different implementation during actual disclosure. This shall not be construed as a limitation.

In this embodiment of the present disclosure, the base station may transmit a part or all of data information of the downlink emergency service by using a downlink spreading code other than the reserved spreading code. The part or all of the data information may use a spreading code the same as that used by a downlink non-emergency service for another user, and consequently a resource conflict occurs. To preferably transmit the downlink emergency service, the base station may send only the part or all of the data information on the conflicting spreading code, and does not send the downlink non-emergency service for the another user.

In a possible implementation, if a data volume that can be transmitted by the base station by using the reserved spreading code is greater than a data volume of the control information of the downlink emergency service, the base station may send a part or all of the data information of the downlink emergency service to the UE by using the reserved spreading code.

For example, it is assumed that a data volume that can be transmitted by the base station on the timeslot 1 (Slot 1) of the HS-PDSCH data frame shown in FIG. 4B is 320 bits, and if the control information of the downlink emergency service is 64 bits (less than 320 bits), the base station can further transmit a part or all of the data information of the downlink emergency service by using the reserved spreading code on the timeslot 1. For another example, it is assumed that a data volume that can be transmitted by the base station on the timeslot i (i is a positive integer) of the DPCH data frame shown in FIG. 4C is 80 bits, and if the control information of the downlink emergency service is 64 bits (less than 80 bits), the base station can further transmit a part or all of the data information of the downlink emergency service by using the reserved spreading code on the timeslot i. The example is merely an implementation of this embodiment of the present disclosure, and there may be a different implementation during actual disclosure. This shall not be construed as a limitation.

It may be understood that to inform UE of an object to which the downlink emergency service is sent, the control information of the downlink emergency service further needs to carry a user equipment identity (UE ID).

During implementation of the downlink emergency service transmission method provided in the present disclosure in the UMTS system, a spreading code used to transmit a downlink emergency service is reserved from a downlink spreading code resource of the UMTS system. When the base station receives an instruction for transmitting a downlink emergency service to UE in a current TTI, the base station may directly send the downlink emergency service to the UE by using the reserved spreading code. Therefore, the downlink emergency service can be transmitted in time.

An implementation of the method in the present disclosure in a GSM (2G) communications system is briefly described below with reference to FIG. 5. The GSM communications system uses a time division multiple access (TDMA) communications manner, and a resource in the GSM communications system is mainly a timeslot.

Figure 5:
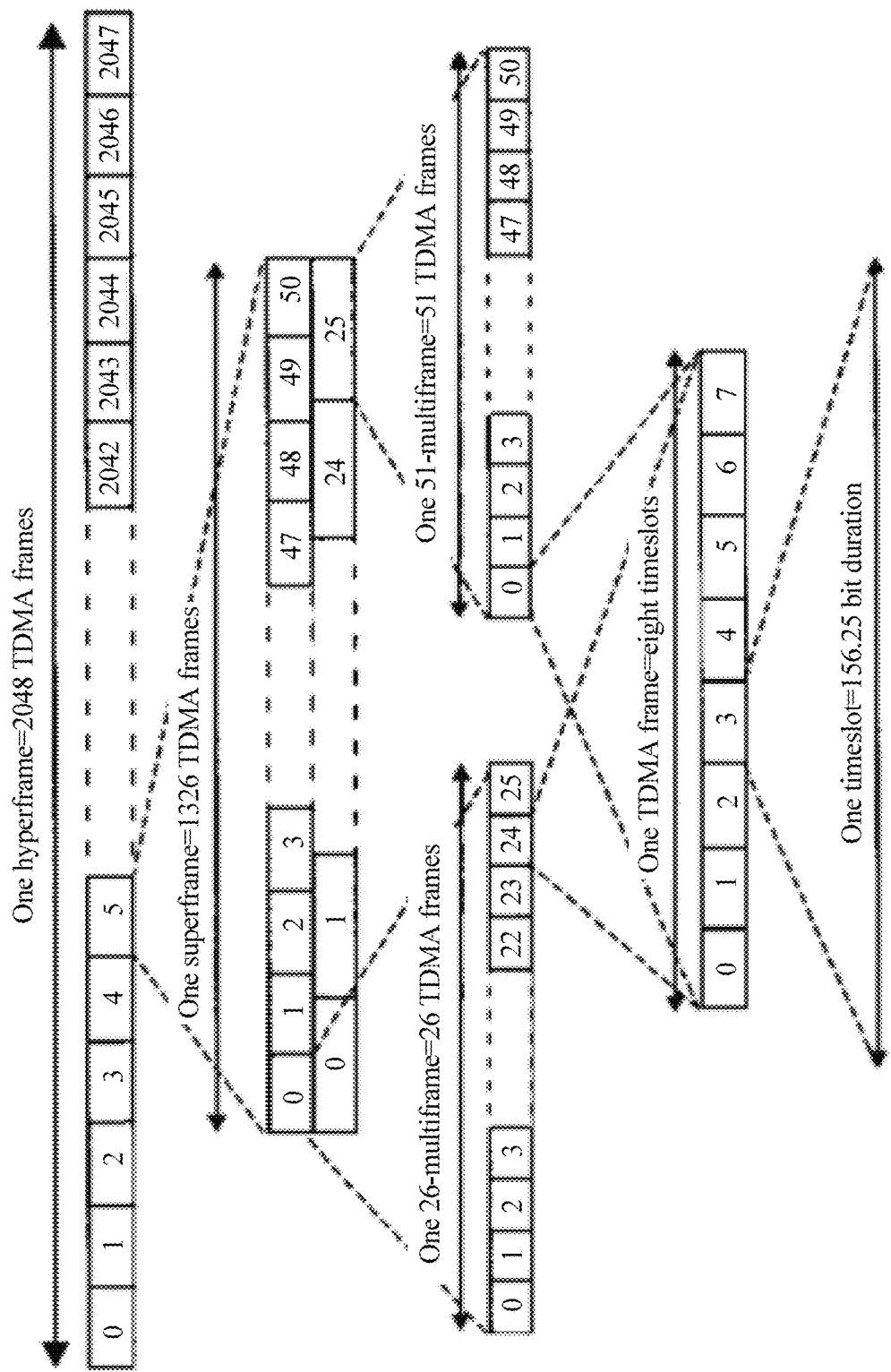
FIG. 5 is a schematic diagram of a GSM data frame according to an embodiment of the present disclosure.

Referring to FIG. 5, as shown in a GSM data frame in FIG. 5, one data frame includes eight timeslots, in other words, eight physical channels. Duration of one timeslot is 0.577 ms. A plurality of frames may constitute a multiframe. For example, a 26-multiframe includes 26 TDMA frames, and a time interval is 120 ms.

To transmit a downlink emergency service in time, a base station may reserve, from the plurality of timeslots included in the data frame, a timeslot (for example, a timeslot 3 in FIG. 5) used to transmit the downlink emergency service. The reserved timeslot herein is reserved resource.

It should be noted that the base station may reserve one or at least two timeslots used to transmit the downlink emergency service.

In this embodiment of the present disclosure, it is unsuitable to reserve excessive timeslots used to transmit the downlink emergency service provided that transmission of the downlink emergency service can be supported, so as to avoid waste of system resource. However, to transmit the downlink emergency service correctly and efficiently, the reserved timeslot needs to at least support transmission of control information of the downlink emergency service.

In this embodiment of the present disclosure, the base station may transmit a part or all of data information of the downlink emergency service by using a timeslot other than the reserved timeslot. The part or all of the data information may use a timeslot the same as that used by a downlink non-emergency service for another user, and consequently a resource conflict occurs. To preferably transmit the downlink emergency service, the base station may send only the part or all of the data information on the conflicting timeslot, and does not send the downlink non-emergency service for the another user.

In a possible implementation, if a data volume that can be transmitted by the base station by using the reserved timeslot is greater than a data volume of the control information of the downlink emergency service, the base station may send a part or all of the data information of the downlink emergency service to UE by using the reserved timeslot.

For example, a data volume that can be transmitted by the base station on the timeslot 3 of the GSM data frame shown in FIG. 5 is 156.25 bits. If the control information of the downlink emergency service is 64 bits (less than 156.25 bits), the base station can further transmit a part or all of the data information of the downlink emergency service by using the timeslot 3. The example is merely an implementation of this embodiment of the present disclosure, and there may be a different implementation during actual disclosure. This shall not be construed as a limitation.

It may be understood that to inform UE of a destination UE to which the downlink emergency service is sent, the control information of the downlink emergency service further needs to carry a user equipment identity (UE ID).

During implementation of the downlink emergency service transmission method provided in the present disclosure in the GSM system, a timeslot resource used to transmit a downlink emergency service is reserved. When the base station receives an instruction for transmitting a downlink emergency service to UE in a current TTI, the base station may directly send the downlink emergency service to the UE by using the reserved timeslot. Therefore, the downlink emergency service can be transmitted in time.

Figure 6:
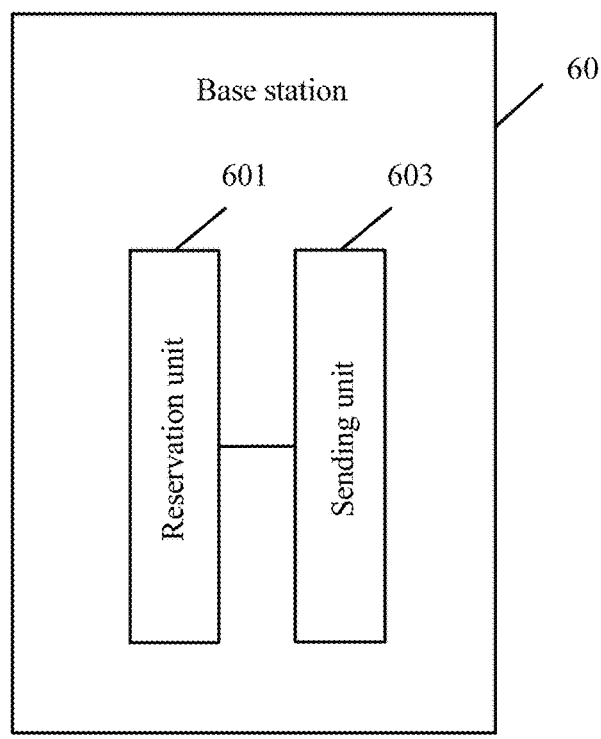
FIG. 6 is a schematic structural diagram of a base station according to an embodiment of the present disclosure.

Referring to FIG. 6, FIG. 6 is a schematic structural diagram of a base station according to an embodiment of the present disclosure. As shown in FIG. 6, a base station 60 may include a reservation unit 601 and a sending unit 603.

The reservation unit 601 is configured to reserve, from system resource, resource as reserved resource for transmitting a downlink emergency service.

The sending unit 603 is configured to send first indication information to user equipment, so as to instruct the user equipment to receive a downlink emergency service by using a resource indicated by the first indication information. The first indication information is used to indicate the reserved resource.

The sending unit 603 is further configured to send the downlink emergency service to the user equipment by using the reserved resource.

In this embodiment of the present disclosure, the downlink emergency service may include control information and data information. The control information of the downlink emergency service may include not only information indicating a modulation and coding scheme, a redundancy version of HARQ retransmission, and the like, but also indication information of a resource occupied by the data information, namely, second indication information.

In this embodiment of the present disclosure, it is unsuitable to have excessive reserved resources provided that transmission of the downlink emergency service can be supported, so as to avoid waste of the system resource. However, to transmit the downlink emergency service correctly and efficiently, the reserved resource needs to at least support transmission of the control information of the downlink emergency service.

During specific implementation, when the downlink emergency service is transmitted, the sending unit 603 may be configured to send the control information of the downlink emergency service to the user equipment by using the reserved resource, where the control information includes the second indication information, so as to instruct the user equipment to receive the data information of the downlink emergency service by using a resource indicated by the second indication information. The second indication information herein may be used to indicate the resource occupied by the data information.

In this embodiment of the present disclosure, the resource occupied by the data information of the downlink emergency service may include a non-reserved resource. The reserved resource is a system resource other than the reserved resource. During specific implementation, if the non-reserved resource occupied by the data information conflicts with a resource scheduled for a downlink non-emergency service, the sending unit 603 may be configured to send only the data information by using the conflicting non-reserved resource, and does not send the downlink non-emergency service.

During actual disclosure, if a downlink resource conflict occurs, the sending unit 603 may be further configured to send third indication information to user equipment that receives the non-emergency service, so as to notify the user equipment that receives the non-emergency service that a resource indicated by the third indication information is occupied, and data transmitted on the occupied resource is not the non-emergency service that is expected to be received by the user equipment, so that the user equipment ignores the data on the occupied resource. The third indication information herein is used to indicate the occupied non-reserved resource.

In this embodiment of the present disclosure, if a data volume that can be transmitted by using the reserved resource is greater than a data volume of the control information of the emergency service, in addition to the control information of the emergency service, the sending unit 603 may be further configured to transmit a part or all of the data information of the downlink emergency service by using the reserved resource.

In this embodiment of the present disclosure, the reserved resource may be a resource statically configured by the reservation unit 601, or the reserved resource may be a resource dynamically configured by the reservation unit 601. The reserved resource in this embodiment of the present disclosure may be a time-frequency resource (for example, an RB or an RE) in an LTE system, a spreading code in a UMTS system, or a timeslot resource in a GSM system. For details, refer to detailed descriptions in the part of method embodiments. Details are not described herein. During actual disclosure, the reserved resource may be an air interface resource in another form. This is not limited herein.

It should be noted that for implementations of function units included in the base station 60, reference may be made to content in the method embodiments and details of implementing the method in the existing communications systems. Details are not described herein.

In addition, an embodiment of the present disclosure provides user equipment. The user equipment may include a receiving unit.

The receiving unit is configured to receive first indication information sent by a base station. The first indication information is used to indicate reserved resource, and the reserved resource is resource that is reserved by the base station from system resource and that is used to transmit a downlink emergency service.

The receiving unit is further configured to receive, based on the first indication information and by using the resource indicated by the first indication information, a downlink emergency service sent by the base station.

In this embodiment of the present disclosure, the downlink emergency service may include control information and data information. The control information of the downlink emergency service may include not only information indicating a modulation and coding scheme, a redundancy version of HARQ retransmission, and the like, but also indication information of a resource occupied by the data information, namely, second indication information.

In this embodiment of the present disclosure, it is unsuitable to have excessive reserved resources provided that transmission of the downlink emergency service can be supported, so as to avoid waste of the system resource. However, to transmit the downlink emergency service correctly and efficiently, the reserved resource needs to at least support transmission of the control information of the downlink emergency service.

Specifically, when the downlink emergency service is transmitted, the base station may send the control information of the downlink emergency service to the user equipment by using the reserved resource. Correspondingly, the receiving unit may be configured to receive the control information of the downlink emergency service based on the first indication information and by using the resource indicated by the first indication information. Because the control information includes the second indication information, the receiving unit may be further configured to receive the data information based on the second indication information and by using a resource indicated by the second indication information. The second indication information herein may be used to indicate the resource occupied by the data information of the downlink emergency service.

In this embodiment of the present disclosure, if a data volume that can be transmitted by the base station by using the reserved resource is greater than a data volume of the control information, the base station further transmits a part or all of the data information of the downlink emergency service by using the reserved resource. Correspondingly, the receiving unit may be further configured to receive the part or all of the data information of the downlink emergency service by using the reserved resource.

In this embodiment of the present disclosure, the reserved resource may be a resource statically configured by the base station, or the reserved resource may be a resource dynamically configured by the base station. The reserved resource in this embodiment of the present disclosure may be a time-frequency resource (for example, an RB or an RE) in an LTE system, a spreading code in a UMTS system, or a timeslot resource in a GSM system. For details, refer to detailed descriptions in the part of method embodiments. Details are not described herein. During actual disclosure, the reserved resource may be an air interface resource in another form. This is not limited herein.

It should be noted that for specific implementations of the receiving unit, reference may be made to content in the method embodiments and details of implementing the method in the existing communications systems. Details are not described herein.

To facilitate implementation of the embodiments of the present disclosure, the present disclosure provides a base station and user equipment, so as to perform the downlink emergency service transmission method provided in the embodiments of the present disclosure.

Figure 7:
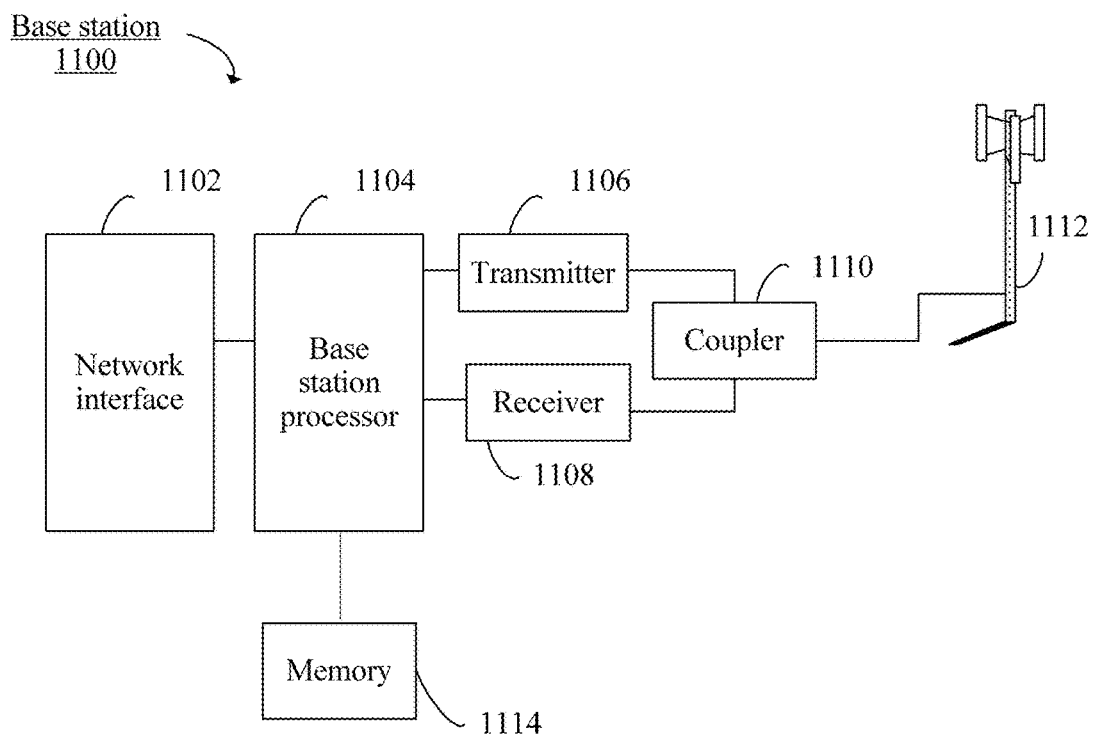
FIG. 7 is a schematic structural diagram of another base station according to an embodiment of the present disclosure.

Referring to FIG. 7, a base station 1100 may include a network interface 1102, a base station processor 1104, a transmitter 1106, a receiver 1108, a coupler 1110, an antenna 1112, and a memory 1114. In some embodiments of the present disclosure, these components may be connected by using a bus or in another manner. A bus connection is used as an example in FIG. 7.

The network interface 1102 is configured to perform data communication between the base station 1100 and user equipment (a mobile station MS in 2G and UE in 3G and 4G). During specific implementation, the network interface 1102 may include one or more of a GSM (2G) wireless network interface, a WCDMA (3G) wireless network interface, an LTE (4G) wireless network interface, or the like, or may be a wireless network interface in future 4.5G or 5G.

The antenna 1112 is configured to convert electromagnetic energy in a transmission line into an electromagnetic wave in free space, or convert an electromagnetic wave in free space into electromagnetic energy in a transmission line. The coupler 1110 is configured to divide a mobile communications signal into a plurality of signals, and allocate the plurality of signals to a plurality of receivers 1108.

The transmitter 1106 is configured to perform transmission processing (for example, modulating) on a mobile communications signal generated by the base station processor 1104. The receiver 1108 is configured to perform reception processing (for example, demodulating) on a mobile communications signal received by the antenna

1112. The transmitter 1106 and the receiver 1108 may be considered as a wireless modem. During specific implementation, there may be one or more transmitters 1106 or receivers 1108.

The memory 1114 is a non-transitory computer readable medium configured to store program code. During specific implementation, the memory 1114 may use a read-only memory (ROM), and the read-only memory may be configured to store the program code.

The base station processor 1104 is configured to manage a wireless channel, make a call, establish and remove a communications link, control cell handover of user equipment in a local control area, and the like. During specific implementation, the base station processor 1104 may include modules such as an AM/CM module, which may be used as a center for speech channel switch and information exchange, a BM module configured to perform call processing, signaling processing, radio resource management, radio link management, and circuit maintenance functions, and a TCSM module configured to perform multiplexing, demultiplexing and code conversion functions. For specific information, refer to knowledge about mobile communications. In this embodiment of the present disclosure, the base station processor 1104 is further configured to invoke the program code stored in the memory 1114 to perform the following, including reserving, from system resource, resource as reserved resource for transmitting a downlink emergency service, sending first indication information to user equipment by using the transmitter 1106, so as to instruct the user equipment to receive a downlink emergency service by using a resource indicated by the first indication information, where the first indication information is used to indicate the reserved resource, and sending the downlink emergency service to the user equipment by using the transmitter 1106 and the reserved resource.

In this embodiment of the present disclosure, the downlink emergency service may include control information and data information. The control information of the downlink emergency service may include not only information indicating a modulation and coding scheme, a redundancy version of HARQ retransmission, and the like, but also indication information of a resource occupied by the data information, namely, second indication information.

In this embodiment of the present disclosure, it is unsuitable to have excessive reserved resources provided that transmission of the downlink emergency service can be supported, so as to avoid waste of the system resource. However, to transmit the downlink emergency service correctly and efficiently, the reserved resource needs to at least support transmission of the control information of the downlink emergency service. Specifically, the base station processor 1104 may send the control information of the downlink emergency service to the user equipment by using the transmitter 1106 and the reserved resource. The control information includes the second indication information, so as to instruct the user equipment to receive the data information of the downlink emergency service by using a resource indicated by the second indication information. The second indication information herein may be used to indicate the resource occupied by the data information.

In this embodiment of the present disclosure, the resource occupied by the data information of the downlink emergency service may include a non-reserved resource. The non-reserved resource is a system resource other than the reserved resource. During specific implementation, if the non-reserved resource occupied by the data information conflicts with a resource scheduled for a downlink non-emergency service, the base station processor 1104 may send only the data information by using the transmitter 1106 and the conflicting non-reserved resource, and does not send the downlink non-emergency service.

During actual disclosure, if a downlink resource conflict occurs, the base station processor 1104 may send, by using the transmitter 1106, third indication information to user equipment that receives the non-emergency service, so as to notify the user equipment that receives the non-emergency service that a resource indicated by the third indication information is occupied, and data transmitted on the occupied resource is not the non-emergency service that is expected to be received by the user equipment, so that the user equipment ignores the data on the occupied resource. The third indication information herein is used to indicate the conflicting non-reserved resource.

In this embodiment of the present disclosure, if a data volume that can be transmitted by using the reserved resource is greater than a data volume of the control information of the emergency service, in addition to the control information of the emergency service, the base station processor 1104 may further transmit a part or all of the data information of the downlink emergency service by using the transmitter 1106 and the reserved resource.

In this embodiment of the present disclosure, the reserved resource may be a resource statically configured by the base station processor 1104, or the reserved resource may be a resource dynamically configured by the base station processor 1104. The reserved resource in this embodiment of the present disclosure may be a time-frequency resource (for example, an RB or an RE) in an LTE system, a spreading code in a UMTS system, or a timeslot resource in a GSM system. For details, refer to detailed descriptions in the part of method embodiments. Details are not described herein. During actual disclosure, the reserved resource may be an air interface resource in another form. This is not limited herein.

It should be noted that the base station 1100 may be applied to a 2G communications system (for example, GSM), a 3G communications system (for example, UMTS), a 4G communications system (LTE), or a future 4.5G or 5G communications system.

It may be understood that for specific execution steps of the base station processor 1104 in the three communications systems, reference may be made to content in the part of method embodiments and specific implementations of the method embodiments in the three communications systems. Details are not described herein.

Figure 8:
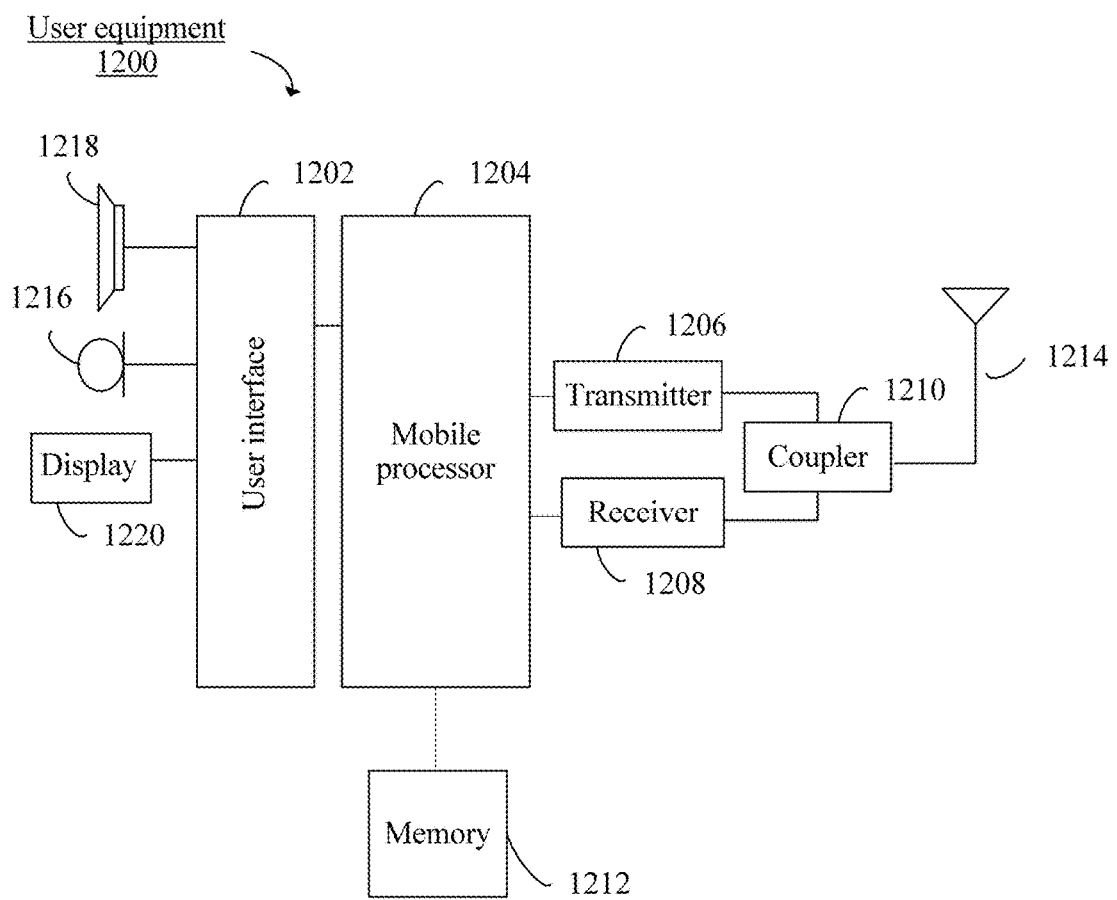
FIG. 8 is a schematic structural diagram of user equipment according to an embodiment of the present disclosure.

Referring to FIG. 8, user equipment 1200 may include an input/output module (including an audio input/output module 1218, a key input module 1216, a display 1220, and the like), a user interface 1202, a mobile processor 1204, a transmitter 1206, a receiver 1208, a coupler 1210, an antenna 1214, and a memory 1212. In some embodiments of the present disclosure, these components may be connected by using a bus or in another manner. A bus connection is used as an example in FIG. 8.

The antenna 1214 is configured to convert electromagnetic energy in a transmission line into an electromagnetic wave in free space, or convert an electromagnetic wave in free space into electromagnetic energy in a transmission line. The coupler 1210 is configured to divide a mobile communications signal into a plurality of signals, and allocate the plurality of signals to a plurality of receivers 1208.

The transmitter 1206 is configured to perform transmission processing (for example, modulating) on a mobile communications signal generated by the mobile processor 1204. The receiver 1208 is configured to perform reception processing (for example, demodulating) on a mobile communications signal received by the antenna 1214. The transmitter 1206 and the receiver 1208 may be considered as a wireless modem. During specific implementation, there may be one or more transmitters 1206 or receivers 1208.

The input/output module is mainly configured to implement an interaction function between the user equipment 1200 and a user/external environment, and mainly includes the audio input/output module 1218, the key input module 1216, the display 1220, and the like. During specific implementation, the input/output module may further include a camera, a touchscreen, a sensor, and the like. The input/output module communicates with the mobile processor 1204 by using the user interface 1202.

The memory 1212 is coupled to the mobile processor 1204, so as to store various software programs and/or a plurality of sets of instructions. During specific implementation, the memory 1212 may include a high-speed random access memory, and may also include a nonvolatile memory or a non-transitory computer readable medium, such as one or more disk storage devices, a flash storage device, or another nonvolatile solid-state storage device. The mobile processor 1204 is mainly configured to invoke the program stored in the memory 1212, and perform the following, including receiving, by using the receiver 1208, first indication information sent by a base station, where the first indication information is used to indicate reserved resource, and the reserved resource is a resource that is reserved by the base station from system resource and that is used to transmit a downlink emergency service, and receiving, based on the first indication information and by using the receiver 1208 and the resource indicated by the first indication information, a downlink emergency service sent by the base station.

In this embodiment of the present disclosure, the downlink emergency service may include control information and data information. The control information of the downlink emergency service may include not only information indicating a modulation and coding scheme, a redundancy version of HARQ retransmission, and the like, but also indication information of a resource occupied by the data information, namely, second indication information.

In this embodiment of the present disclosure, it is unsuitable to have excessive reserved resources provided that transmission of the downlink emergency service can be supported, so as to avoid waste of the system resource. However, to transmit the downlink emergency service correctly and efficiently, the reserved resource needs to at least support transmission of the control information of the downlink emergency service.

Specifically, the base station may send the control information of the downlink emergency service to the user equipment 1200 by using the reserved resource. Correspondingly, the mobile processor 1204 may receive the control information of the downlink emergency service by using the receiver 1208 and the reserved resource. Because the control information includes the second indication information, the mobile processor 1204 may further receive the data information by using the receiver 1208 and a resource indicated by the second indication information. The second indication information herein may be used to indicate the resource occupied by the data information of the downlink emergency service.

In this embodiment of the present disclosure, if a data volume that can be transmitted by the base station by using the reserved resource is greater than a data volume of the control information, the base station further transmits a part or all of the data information of the downlink emergency service by using the reserved resource. Correspondingly, the mobile processor 1204 may further receive the part or all of the data information of the downlink emergency service by using the receiver 1208 and the reserved resource.

In this embodiment of the present disclosure, the reserved resource may be a resource statically configured by the base station, or the reserved resource may be a resource dynamically configured by the base station. The reserved resource in this embodiment of the present disclosure may be a time-frequency resource (for example, an RB or an RE) in an LTE system, a spreading code in a UMTS system, or a timeslot resource in a GSM system. For details, refer to detailed descriptions in the part of method embodiments. Details are not described herein. During actual disclosure, the reserved resource may be an air interface resource in another form. This is not limited herein.

It should be noted that the user equipment 1200 may be a mobile station in a 2G communications system (for example, GSM), UE in a 3G communications system (for example, UMTS) and a 4G communications system (for example, LTE), or a user terminal in a future 4.5G or 5G communications system.

It may be understood that for specific execution steps of the mobile processor 1204, reference may be made to content in the part of method embodiments and specific implementations of the method embodiments in the three communications systems. Details are not described herein.

In addition, an embodiment of the present disclosure further provides a communications system (as shown in FIG. 1). The communications system includes a base station and user equipment. In an implementation, the base station may be the base station 1100 described in FIG. 7, and the user equipment may be the user equipment 1200 described in FIG. 8.

It should be noted that the base station may be the base station in all the foregoing descriptions, and the user equipment may be the user equipment in all the foregoing descriptions. Details are not described herein.

In conclusion, during implementation of the embodiments of the present disclosure, the base station reserves, from the system resource, the reserved resource used to transmit the downlink emergency service, so that the base station can directly send the downlink emergency service to the user equipment by using the reserved resource, thereby improving transmission efficiency of the downlink emergency service, and implementing timely transmission of the downlink emergency service. In addition, the base station notifies the user equipment of the indication information of the reserved resource, so that the user equipment needs to monitor only the reserved resource to determine whether there is a downlink emergency service sent to the user equipment, and does not need to search all the system resource, thereby reducing design complexity of the user equipment.

Persons of ordinary skill in the art can understand that some or all of the procedures of the methods in the embodiments may be implemented by a computer program instructing relevant hardware. The program may be stored in a non-transitory computer readable storage medium. When the program runs, the procedures of the methods in the embodiments may be included. The foregoing storage medium may include a magnetic disk, an optical disc, a read-only memory (ROM), a random access memory (RAM), or the like.

What is claimed is:

1. A downlink emergency service transmission method, comprising:

receiving, by a user equipment in a first transmission time interval (TTI), first indication information sent by a base station, wherein the first indication information indicates a reserved resource, and wherein the reserved resource is a first resource that is reserved by the base station from a system resource and that is used to transmit a downlink emergency service; and receiving, by the user equipment, in the first TTI, according to the first indication information and using the first resource indicated by the first indication information, a downlink emergency service sent by the base station.

2. The method according to claim 1, wherein the receiving the downlink emergency service comprises:

receiving, by the user equipment, control information of the downlink emergency service using the first resource indicated by the first indication information, wherein the control information comprises second indication information, and wherein the second indication information indicates a second resource occupied by data information of the downlink emergency service; and receiving, by the user equipment, the data information using the second resource indicated by the second indication information.

3. The method according to claim 1, wherein the base station and the user equipment are in a long term evolution (LTE) communications system, wherein, in a single transmission time interval, the reserved resource is K resource elements (REs) constituted by M symbols in a time domain and N subcarriers in a frequency domain, wherein M, N, and K are all positive integers, and wherein K=M*N.

4. The method according to claim 1, wherein the base station and the user equipment are in a universal mobile telecommunications system (UMTS), and wherein, in a single transmission time interval, the reserved resource is an available spreading code that is reserved by the base station from downlink spreading codes of the universal mobile telecommunications system and is used to transmit the downlink emergency service.

5. The method according to claim 1, wherein the base station and the user equipment are in a global system for mobile communications (GSM), and wherein, in a single transmission time interval, the reserved resource is a timeslot that is reserved by the base station from a plurality of timeslots in a data frame transmitted in the single transmission time interval and is used to transmit the downlink emergency service.

6. A base station, comprising:

a processor;

a non-transitory computer-readable storage medium storing a program to be executed by the processor, the program including instructions to reserve, from a system resource, a first resource as a reserved resource for transmitting a downlink emergency service; and a transmitter, configured to transmit, to a user equipment in a first transmission time interval (TTI), first indication information instructing the user equipment to receive a downlink emergency service using the first resource indicated by the first indication information, wherein the first indication information indicates the reserved resource, wherein the transmitter is further configure to transmit the downlink emergency service in the first TTI to the user equipment using the reserved resource.

7. The base station according to claim 6, wherein the transmitter is further configured to transmit control information of the downlink emergency service to the user equipment using the reserved resource, wherein the control information comprises second indication information instructing the user equipment to receive data information of the downlink emergency service using a second resource indicated by the second indication information, and the second indication information indicates a third resource occupied by the data information.

8. The base station according to claim 7, wherein the third resource occupied by the data information comprises a non-reserved resource, and the non-reserved resource is a system resource other than the reserved resource; and wherein the program further includes instructions to send, when the non-reserved resource occupied by the data information conflicts with a resource scheduled for a non-emergency service, only the data information by using the conflicting non-reserved resource.

9. The base station according to claim 8, wherein program further includes instructions to send, when the non-reserved resource occupied by the data information conflicts with the resource scheduled for the non-emergency service, third indication information to user equipment that receives the non-emergency service, so as to notify the user equipment that receives the non-emergency service that a resource indicated by the third indication information is occupied, wherein the third indication information indicates the occupied non-reserved resource.

10. The base station according to claim 6, wherein the base station and the user equipment are in a long term evolution (LTE) communications system, wherein, in a single transmission time interval, the reserved resource is K resource elements (REs) constituted by M symbols in time domain and N subcarriers in frequency domain, wherein M, N, and K are all positive integers, and wherein K=M*N.

11. The base station according to claim 6, wherein the base station and the user equipment are in a universal mobile telecommunications system (UMTS), and wherein, in a single transmission time interval, the reserved resource is an available spreading code that is reserved by the base station from downlink spreading codes of the universal mobile telecommunications system and is used to transmit the downlink emergency service.

12. The base station according to claim 6, wherein the base station and the user equipment are in a global system for mobile communications (GSM), and wherein, in a single transmission time interval, the reserved resource is a timeslot that is reserved by the base station from a plurality of timeslots in a data frame transmitted in the single transmission time interval and is used to transmit the downlink emergency service.

13. User equipment, comprising:

a receiver, configured to receive first indication information sent by a base station in a first transmission time interval (TTI), wherein the first indication information indicates a reserved resource, wherein the reserved resource is a first resource that is reserved by the base station from system resource and is used to transmit a downlink emergency service, and wherein then receiver is further configured to receive, according to the first indication information, in the first TTI, and using the first resource indicated by the first indication information, a downlink emergency service sent by the base station.

14. The user equipment according to claim 13, wherein the receiver is further configured to receive control information of the downlink emergency service according to the first indication information and using the first resource indicated by the first indication information, wherein the control information comprises second indication information, and wherein the second indication information indicates a second resource occupied by data information of the downlink emergency service, and wherein the receiver is further configured to receive the data information according to the second indication information and using the resource indicated by the second indication information.

15. The user equipment according to claim 13, wherein the base station and the user equipment are in a long term evolution (LTE) communications system, wherein, in a single transmission time interval, the reserved resource is K resource elements (REs) constituted by M symbols in time domain and N subcarriers in frequency domain, wherein M, N, and K are all positive integers, and wherein K=M*N.

16. The user equipment according to claim 13, wherein the base station and the user equipment are in a universal mobile telecommunications system (UMTS), and wherein, in a single transmission time interval, the reserved resource is an available spreading code that is reserved by the base station from downlink spreading codes of the universal mobile telecommunications system and is used to transmit the downlink emergency service.

17. The user equipment according to claim 13, wherein the base station and the user equipment are in a global system for mobile communications (GSM), and wherein, in a single transmission time interval, the reserved resource is a timeslot that is reserved by the base station from a plurality of timeslots in a data frame transmitted in the single transmission time interval and is used to transmit the downlink emergency service.

* * * * *